Sept. 21, 1954  A. H. STAFFORD  2,689,356
THREAD CLEANING TOOL WITH EJECTOR PIN FOR VALVE HOUSINGS
Filed July 14, 1952
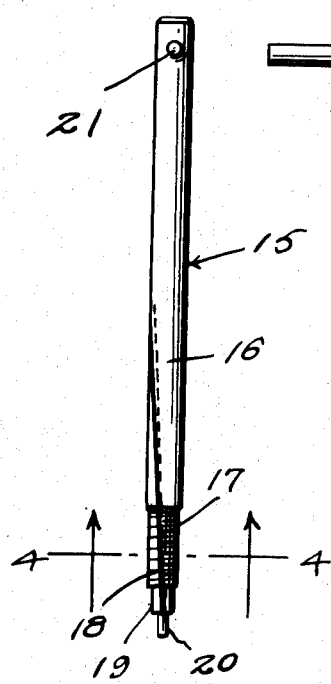
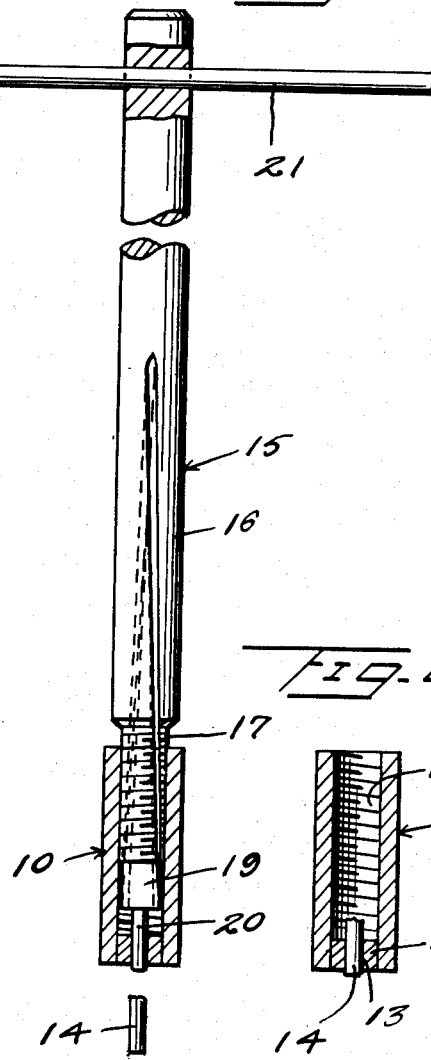
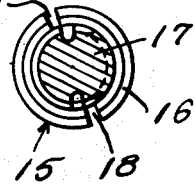
INVENTOR
Arthur H. Stafford
BY Kimmel & Crowell
ATTORNEYS Patented Sept. 21, 1954

2,689,356

UNITED STATES PATENT OFFICE 2,689,356

THREAD CLEANING TOOL WITH EJECTOR PIN FOR VALVE HOUSINGS

Arthur Herbert Stafford, Miami, Fla.

Application July 14, 1952, Serial No. 298,743

1 Claim. (Cl. 7—17)

This invention relates to a tool for removing a broken needle valve.

In carburetors and other valve structures, needle valves are provided, and such needle valves include a small diameter pin engageable through a valve opening. In carburetors a valve of this type is used for the idler valve, and it frequently happens that the pin breaks off from the shank and sticks in the opening. Removal of the broken pin is ordinarily quite a problem as the pin must be removed without damaging the valve seat or the opening in which the pin is disposed. It is, therefore, an object of this invention to provide a tool by means of which the broken pin can be easily and quickly removed without damage to the adjoining parts.

Another object of this invention is to provide a tool which will clean out the threads for the valve stem or shank so that a new needle valve can be easily inserted in the valve socket or housing.

With the above and other objects in view, my invention consists in the arrangement, combination and details of construction disclosed in the drawings and specification, and then more particularly pointed out in the appended claim.

In the drawing:

Figure 1 is a detailed side elevation of a needle valve remover constructed according to an embodiment of this invention.

Figure 2 is an enlarged side elevation partly broken away and in section showing the tool in operative position in a needle valve housing.

Figure 3 is a sectional view of a needle valve housing showing a broken pin or needle disposed in the housing.

Figure 4 is a sectional view taken on the line 4—4 of Figure 1.

Referring to the drawing, the numeral 10 designates generally a needle valve housing, such as the housing used in carburetors and more particularly for an idler needle valve. The valve housing 10 is interiorly threaded, as at 11, and a valve seat member 12 is disposed in the inner end of the housing 10. The seat member 12 is formed with a cylindrical bore 13 within which the valve plug or pin 14 of a needle valve is adapted to engage. Normally the pin 14 has relatively close engagement with the wall of the opening 13 and during the use of the carburetor, corrosion frequently makes the pin 14 bind in the opening 13 so that adjustment of the idler valve causes the pin 14 to break off of the shank or stem of the needle valve.

In order to provide a means whereby the broken pin 14 may be removed without damage to the valve seat member 12, I have provided a pin removing tool generally designated as 15. The tool 15 is constructed in the form of an elongated bar 16, having a reduced diameter threaded shank 17 which is provided with longitudinally extending channels 18. The channels 18 form a tap with the threads of the shank 17 so that as the latter is threaded into the housing 10, the interior threads 11 of the housing 10 will be cleaned of any corrosion which may be disposed therein, such matter being dislodged by the threads 11 and extruded from the interior of the housing through the channels 18.

The shank 17 terminates in an unthreaded stud 19 and a relatively small diameter ejector pin 20 extends axially from the stud 19. Preferably the ejector pin 20 is of a diameter slightly less than the diameter of the opening 13 so that pin 20 may readily pass through the opening 13 in the forcible pushing or ejection of the broken valve pin 14. The tool 15 is preferably formed of tool steel, and the outer portion of the bar 16 has a cross bar or handle 21 secured thereto.

In the use and operation of this tool, when the needle valve pin 14 is broken off from the shank or stem of the valve and is stuck in the valve seat 12, the pin 14 may be removed by threading the shank 17 into the bore 13 of the needle valve housing 10. Ejector pin 20 will contact with the broken valve pin 14, and the latter will be forcibly pushed out of the valve seat or body 12 without damage to the seat or to any portion of the housing 10. The inward threading of the shank 17 will by reason of the tap formation of the shank serve to clean out the threads 11 so that when a new needle valve is inserted, such new valve will freely thread into the housing 10.

I do not mean to confine myself to the exact details of construction herein disclosed, but claim all variations falling within the purview of the appended claim.

What is claimed is:

In a broken needle valve removing tool of the type comprising an elongated bar, threads at one end of said bar, a handle at the other end of said bar, and an ejector pin extending axially from said one end, means for cleaning corrosion dislodged from the valve housing by said threads, said means comprising lengthwise grooves in said bar intersecting whereby said threads corrosion from the valve housing is extruded through said groove.

References Cited in the file of this patent

UNITED STATES PATENTS

| Number | Name | Date |
|---|---|---|
| 1,128,563 | Whitney | Feb. 16, 1915 |
| 2,054,267 | Reilly | Sept. 15, 1936 |
| 2,350,675 | Feldman | June 6, 1944 |
| 2,417,360 | Heintzelman | Mar. 11, 1947 |
| 2,564,196 | Denzler | Aug. 14, 1951 |